No. 784,412.  
Patented March 7, 1905.

UNITED STATES PATENT OFFICE.

GEORG MERLING, OF FRANKFORT-ON-THE-MAIN, AND ROBERT WELDE, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

MATERIALS FOR PERFUMES AND PROCESS OF MAKING SAME.

SPECIFICATION forming part of Letters Patent No. 784,412, dated March 7, 1905.

Application filed May 2, 1903. Serial No. 155,435. (Specimens.)

*To all whom it may concern:*

Be it known that we, GEORG MERLING, Ph. D., professor of chemistry, residing at Frankfort-on-the-Main, and ROBERT WELDE, Ph. D., residing at Höchst-on-the-Main, Germany, both citizens of the Empire of Germany, have invented certain new and useful Improvements in Processes of Making Materials Intended for Perfumes, of which the following is a specification.

We have found that oxy-cyclohexancarboxylic acids, their esters, and oxy-cyclohexancarbinols (terpenglycols) having the general formula

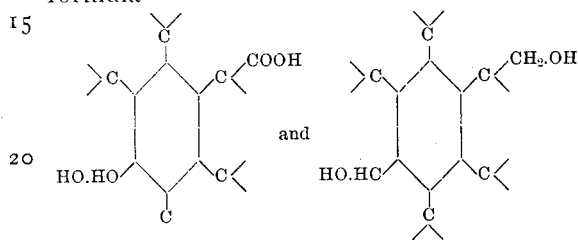

may be obtained by treating cyclohexenoncarboxylic acids of the type

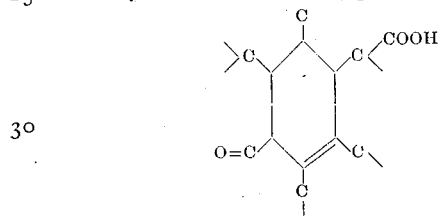

or their esters with reducing agents.

*Example I—Manufacture of dimethyl-oxycyclohexancarboxylic acid and dimethyl-oxycyclohexancarbinol,*

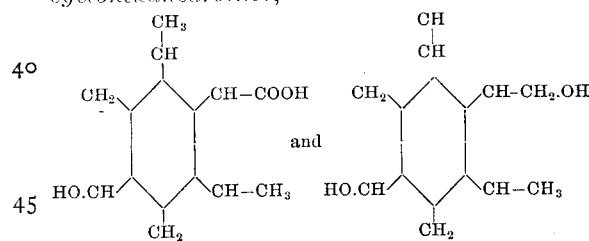

One part, by weight, of dimethylcyclohexenoncarboxylic-acid ester

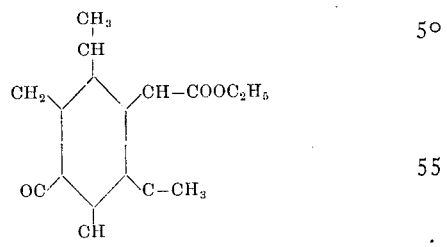

boiling at 152° to 154° centigrade, (seventeen millimeters pressure,) (Knövenagel *Ann. Chem.* 281, 109,) is dissolved in ten parts of absolute alcohol, and into the solution contained in the flask with reflex condenser is gradually introduced one part of sodium and the whole finally heated. When the sodium is dissolved, it is diluted with water and the alcohol is distilled with steam. The flask now contains two layers, a lower aqueous and colorless one containing, essentially, the sodium salt of the oxy acid and an upper oily and brown layer consisting chiefly of the oxy-carbinol. The latter is extracted with ether, and the alkaline solution, still containing dissolved in it considerable quantities of oxy-carbinol, is repeatedly shaken with ether to eliminate the former. The combined ethereal solutions of oxy-carbinol are dried with anhydrous sodium sulfate, and the viscous oil remaining on the ether being distilled is purified by distillation in a vacuum. To obtain the oxy acid, the alkaline solution exhausted with ether is saturated with dilute sulfuric or hydrochloric acid and the small quantity of dark resin which may separate is filtered and the filtrate repeatedly shaken with ether. The ethereal solution being dried with sodium sulfate, there remains after carefully distilling the ether (preferably in a vacuum) the oxy acid as a thick yellowish oil.

*Dimethyl-oxy-cyclohexancarboxylic acid.—*  
The crude oxy-acid thus obtained is not uniform. It consists of a mixture of two geometrically-isomeric oxy acids and some dimethyl-cyclohexencarboxylic acid:

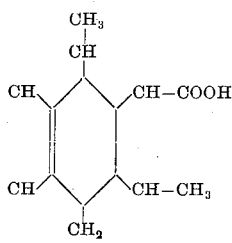

The oxy acid inclines greatly to form lactones. When distilled in a vacuum, one modification of the acid readily eliminates water, whereas the other only slowly and at a higher temperature, two different lactones being formed, one of which is liquid (probably ϛ-lactone) and the other solid, (probably γ-lactone,) Both lactones are similarly composed $C_9H_{14}O_2$ and boil at 129° to 131° centigrade, (twelve millimeters pressure.) They are insoluble in alkali carbonates and slowly dissolved when boiled with caustic alkalies.

The esters of dimethyl-oxy-cyclohexancarboxylic acid may be obtained by the usual methods of esterification, but still better by the action of the respective alkyl iodid on the potassium salt of the acid. The ethyl ester thus obtained $C_8H_{14}(OH)COOC_2H_5$ is a thick colorless oil boiling at 144° to 146° centigrade, (sixteen millimeters pressure.) The dimethyl-oxy-cyclohexancarboxylic acid (mixture of two geometrically-isomeric modifications) obtained by the pure ester being hydrolyzed with alcoholic alkali is a colorless viscous oil soluble in water, which when cold does not discolor in a soda solution of permanganate.

Dimethyl-oxy-cyclohexancarbinol is an exceedingly viscous syrup readily soluble in water and boiling at 159° to 161° centigrade, (fourteen millimeters pressure.) Like the dimethyl-oxy-cyclohexancarboxylic acid, the oxy-carbinol also consists of a mixture of two geometrically-isomeric bodies. The crude oxy-carbinol contains also a small quantity of dimethyl-cyclohexencarbinol and dimethyl-cyclohexancarbinol

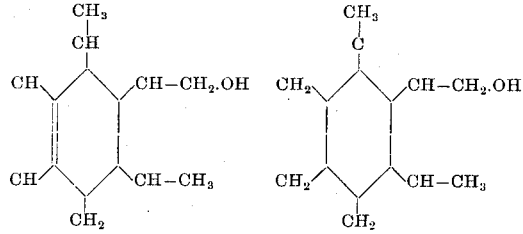

and some not hydrolyzed dimethyl-oxy-cyclohexancarboxylic-acid ethyl ester, their acid esters (acetyl, benzoyl, &c., compounds) being oils of an agreeable odor of flowers.

The dimethyl-oxy-cyclohexancarbinol when boiled with acetic acid anhydrid is an oily diacetyl compound:

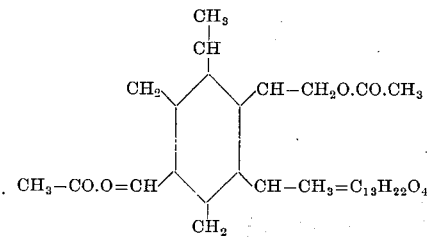

which boils at 160° centigrade (thirteen millimeters pressure) and is immiscible with water. To reduce the dimethyl-cyclohexenon-carboxylic-acid ester to the aforedescribed dimethyl-cyclo-oxycarboxylic acid, the dimethyl-cyclo-oxy-hexancarbinol occurs almost smoothly, nearly equal quantities of both compounds being formed.

As the reduction of an acid to an alcohol is somewhat unusual, the analysis of dimethyl-oxy-cyclohexancarbinol and its diacetyl compounds are cited here to prove our statement.

1. 0.3225 gram of oxy-carbinol ($C_9H_{18}O_2$) yields 0.8110 gram of $CO_2$ and 0.3215 gram of $H_2O$.
2. 0.2627 gram of oxy-carbinol ($C_9H_{18}O_2$) yields 0.6585 gram of $CO_2$ and 0.2614 gram of $H_2O$.

Substance 1 and 2 are differently prepared.

| Calculated for $C_9H_{18}O_2$. | Found. | |
|---|---|---|
| | I. | II. |
| C:68.35 | 68.55 | 68.36 |
| H:11.39 | 11.07 | 11.05 |

0.2885 gram of diacetyl-oxy-carbinol ($C_{13}H_{22}O_4$) yields 0.6842 $CO_2$ and 0.2398 $H_2O$.

| Calculated for $C_{13}H_{22}O_4$. | Found. |
|---|---|
| C:64.46 | 64.67 |
| H:9.09 | 9.23 |

*Example II—Manufacture of trimethyl-oxy-cyclohexancarboxylic acid and trimethyl-oxy-cyclohexancarbinol,*

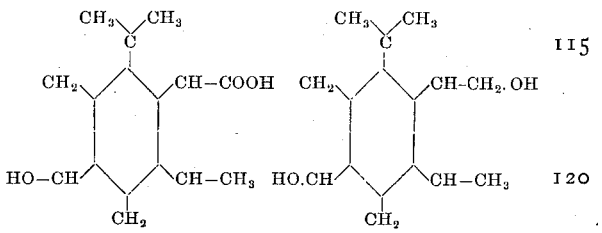

These two compounds are obtained by reducing trimethyl-cyclohexenoncarboxylic-acid ester described in our other application of same date:

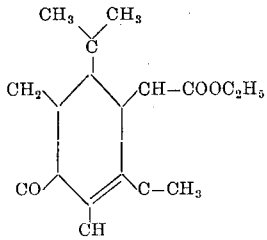

The reduction occurs exactly as described in Example I. However, the further working up of the reaction solution and the isolation of the products obtained is somewhat modified, for on the alcohol being expelled the oil soluble with difficulty in water still contains considerable portions (up to sixty per cent. of its weight) of trimethyl-oxy-cyclohexancarboxylic acid ethylester hydrolyzed with difficulty, besides trimethyl-oxy-cyclohexancarbinol and small portions of trimethyl-cyclohexen and trimethyl-cyclohexancarbinol. To separate, therefore, the carbinols, the oil separated from the lye is boiled at least for one day with highly-concentrated alcoholic potash in a vessel with reflux condenser or heated for some hours in a closed vessel with alcoholic potash to 130° to 150° centigrade. After diluting with water and expelling the alcohol with steam the carbinols remain as a yellow thick layer of oil. The further working up of the contents of the flask and of the original alkali lye occurs as described in Example I. The quantities of trimethyl-oxy-cyclohexancarboxylic acid and trimethyl-oxy-cyclohexancarbinol obtained by reducing trimethyl-cyclohexenoncarboxylic acid ester are in the proportion of about three to one. The two compounds appear also each in form of a cis and a trans compound. The crude trimethyl-oxy-cyclohexancarboxylic acid is a colorless exceedingly viscous syrup boiling without decomposing at 176° to 178° centigrade, (eight millimeters pressure.) This oxy acid also consists of two geometrical isomerics which we succeeded to isolate. The cis-trimethyl-oxycyclohexancarboxylic acid forms colorless brilliant prisms melting at 141° to 143° centigrade, readily soluble in water and benzene. When heated with potassium bisulfite, the acid is transformed into lactone which crystallizes from cigroine in caminæ; melting-point, 56° to 57° centigrade; boiling-point, 122° to 123° centigrade, (nine millimeters pressure.) The trans-trimethyl-oxy-cyclohexancarboxylic acid forms brilliant crystals of a die-like shape and melts at 151° to 153° centigrade. When heated with potassium bisulfate, the acid is transformed into trimethyl-cyclohexencarboxylic acid. The trans-oxy acid is soluble with difficulty in water and benzene. The ethyl ester $C_9H_{16}(OH).$ $COOC_2H_5$ (obtained from the acid mixture) is a viscous colorless oil boiling at 15° to 154°, (seventeen millimeters pressure.) The ester is smoothly oxidized by Beckmann's solution to trimethyl-keto-cyclohexancarboxylic acid ester

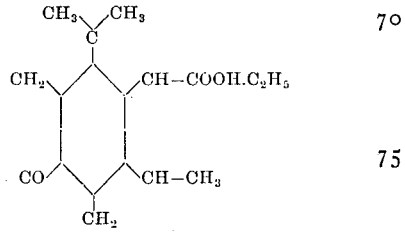

which is a thin colorless oil boiling at 132° to 133° centigrade, (twelve millimeters pressure.)

Besides trimethyl-oxy-cyclohexancarboxylic acid also a small quantity of trimethyl-cyclohexencarboxylic acid is obtained

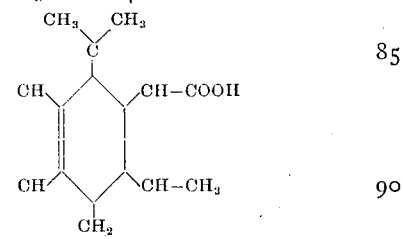

of which the ethyl ester is a thin liquid oil of pleasant odor, melting at 95° to 98° centigrade, (twelve millimeters pressure.) The position of the double links is not definitely settled.

Trimethyl-oxy-cyclohexancarbinol is an exceedingly viscous syrup, consisting likewise of a mixture of two geometrically isomeric modifications. The combination is moderately soluble in water; boiling-point, 150° to 155° centigrade, (seven to eight millimeters pressure.)

We succeeded in separating one modification of the glycol in a pure state. It was obtained from hot benzene in colorless crystals melting at 92° to 93° centigrade and boiling at 152° centigrade, (eight millimeters pressure.)

Besides oxy-carbinol small quantities of trimethyl-cyclohexencarbinol and trimethyl-cyclohexancarbinol are obtained.

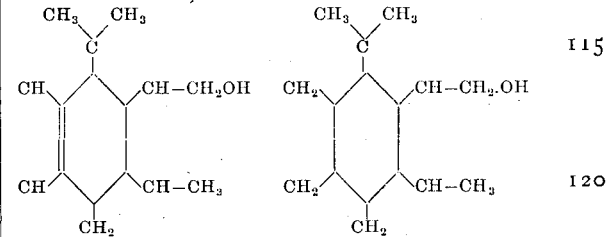

The position of the double links is not definitely settled.

*Example III—Manufacture of trimethyl-oxy-cyclohexancarboxylic acid by reducing*

*trimethyl-cyclohexenoncarboxylic acid.*—The trimethyl-cyclohexenoncarboxylic acid is obtained by hydrolysis from its ester with alcoholic potash at moderate temperature. It forms crystals which decompose on melting or when boiled with water or alkalies into carbonic acid and isophoron.

Twenty-five parts of trimethyl-cyclohexenoncarboxylic acid are dissolved in dilute caustic soda-lye, and the solution is diluted with two hundred and fifty parts of alcohol, twenty-two parts of sodium, or the corresponding quantity of sodium amalgam being gradually introduced, while care is taken by cooling for the temperature not to rise above 25° centigrade in the one case and not above 45° centigrade in the other. The result was alike in both cases. The sodium having been absorbed, the solution was distilled with steam to expel the alcohol and isophoron. From the remaining alkaline solution the trimethyl-oxy-cyclohexancarboxylic acid was isolated in the usual manner. Formation of glycol does not occur here. The yield of oxy acid was only twenty per cent. of the trimethyl-cyclohexenoncarboxylic acid. The greater part of the latter was decomposed into carbonic acid and isophoron.

*Example IV—Electrolytic reduction of trimethyl-cyclohexenoncarboxylic acid ester to trimethyl-oxy-cyclohexancarboxylic acid ester.*—Ten parts of trimethyl-cyclohexenoncarboxylic acid ester are dissolved in one hundred parts of caustic-soda lye of five-per-cent. strength in the presence of alcohol and subjected to hydrolysis by introducing a current of $CO_2$ while employing a diaphragm. The alcohol is then distilled with steam, the soda-alkaline liquid shaken with ether, and after expelling the ether the oil is boiled with alcoholic potash for three hours to destroy any unchanged keto-ester. After expelling the alcohol and isophoron with steam the alkaline liquid is acidified and the oxy acid is obtained by shaking out with ether. In the same manner the trimethyl-cyclohexenoncarboxylic acid may be reduced by electrolysis to trimethyl-oxy-cyclohexancarboxylic acid. The yield of oxy acid in both cases is much inferior to that obtained by any of the above-described reducing methods.

*Example V—Manufacture of trimethyl-oxy-cyclohexancarboxylic acid ester by reducing trimethyl-clyclohexenoncarboxylic acid ester with zinc, iron, magnesia, and the like in acid solution.*—Twenty-five parts of trimethyl-cyclohexenoncarboxylic acid ester are distilled with the equal weight of glacial acetic acid and saturated with hydrogen chlorid while cooling. After standing for twenty-four hours thirty parts of zinc-dust are added in small doses. Much heat being evolved during the reaction, the solution is first cooled with ice, and on the reaction diminishing heated for some hours on a boiling-water bath. The nascent hydrogen is rapidly absorbed by the keto-ester, so that an evolution of hydrogen occurs only at the end of the operation. It is diluted with water. An excess of caustic-soda lye is added and distilled with steam, whereupon small quantities of trimethyl-cyclohexencarboxylic acid ester passes over. The red-yellow oil remaining in the flask is extracted with ether, dried with potash, and distilled in a vacuum after having distilled the ether. From the part boiling at 125° to 140° centigrade (nine millimeters pressure) pure trimethyl-oxy-cyclo-hexancarboxylic ester of known properties and same boiling-point may be separated by redistillation. Besides this ester large quantities of bodies boiling at a high temperature are formed, which remain in the flask as a thick brown syrup. The result is similar if iron or magnesia or sodium amalgam is used for zinc and hydrogen bromid or iodid or another mineral acid for hydrogen chlorid.

The oxy-cyclohexancarboxylic acids, cyclohexencarboxylic acids, oxy-cyclohexancarbinols and cyclohexencarbinols, and their derivatives obtained by this process are to be used as perfumes or as primary material for the manufacture of perfumes.

Having now described our invention, what we claim is—

1. The process herein described of making oxy-cyclohexancarboxylic acids and their esters having the general formula

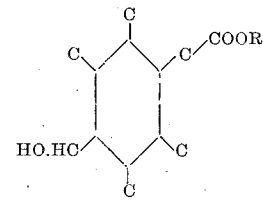

wherein "R" means hydrogen or an alcohol radical, which consists in treating cyclohexanoncarboxylic acid of the type

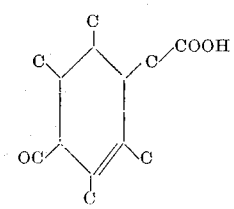

and their esters with reducing agents.

2. As new products oxy-cyclohexancarboxylic acids having the general formula

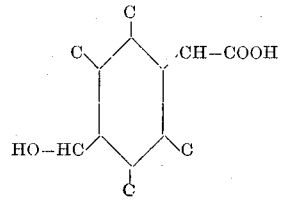

being soluble with difficulty in water, readily soluble in alcohol and ether, boiling in a vacuum without decomposition and without formation of lactones.

3. As a new product the trimethyl-oxy-cyclohexancarboxylic acid having the formula

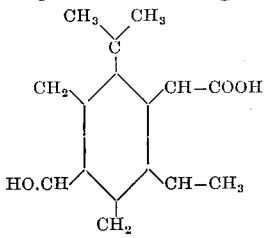

being a mixture of two different physical isomeric modifications, both forming colorless crystals melting at 141° to 143° centigrade and at 151° to 153° centigrade respectively, the acid mixture boiling at 176° to 178° centigrade under eight millimeters pressure, soluble with difficulty in water, readily soluble in alcohol and ether and adapted for the manufacture of perfumes.

In testimony that we claim the foregoing as our invention we have signed our names in presence of two subscribing witnesses.

GEORG MERLING.
ROBERT WELDE.

Witnesses:
ALFRED BRISBOIS,
BERNH LEYDECKER.